United States Patent
Kenney et al.

(10) Patent No.: US 6,704,988 B2
(45) Date of Patent: Mar. 16, 2004

(54) METHOD OF MAKING A CONTINUOUS LAMINATE COIL

(75) Inventors: Rick Thomas Kenney, Longwood, FL (US); Todd Kenneth Arlon Fischer, Oxford, MD (US)

(73) Assignee: GKD-USA Incorporated, Cambridge, MD (US)

( * ) Notice: Subject to any disclaimer, the term of this patent is extended or adjusted under 35 U.S.C. 154(b) by 0 days.

(21) Appl. No.: 10/117,336

(22) Filed: Apr. 8, 2002

(65) Prior Publication Data

US 2003/0188415 A1 Oct. 9, 2003

(51) Int. Cl.[7] ............................................. B21D 39/00
(52) U.S. Cl. ................ 29/407.09; 29/407.1; 242/534.1; 242/548.2; 242/563.1; 228/193; 228/194; 228/235.1
(58) Field of Search ..................... 29/407.09, 407.1, 29/525.14, 709, 712, 714; 242/530, 534.1, 538, 548.2, 563.1, 422.6, 422.7; 226/19, 20; 228/194, 193, 234.1, 235.1, 46; 428/592, 615, 635, 636

(56) References Cited

U.S. PATENT DOCUMENTS

| | | | | |
|---|---|---|---|---|
| 2,641,416 A | * | 6/1953 | McCleary et al. | 242/563.1 |
| 3,368,268 A | * | 2/1968 | Sherman | 29/705 |
| 3,537,170 A | * | 11/1970 | Sinizer et al. | 228/118 |
| 3,908,881 A | * | 9/1975 | McCann | 226/19 |
| 4,958,111 A | * | 9/1990 | Gago | 226/24 |
| 6,269,995 B1 | * | 8/2001 | Rich et al. | 226/17 |
| 6,464,129 B2 | * | 10/2002 | Stueber et al. | 228/194 |

FOREIGN PATENT DOCUMENTS

JP 051689145 A * 7/1993

* cited by examiner

*Primary Examiner*—Gregory Vidovich
*Assistant Examiner*—Jermie E. Cozart

(57) ABSTRACT

A method and an apparatus incorporating the method for making a long, continuous laminate. A plurality of layers of materials are simultaneously wound around a metal hub. Strips of refractory material, perforated metal, metal foil, metal mesh, and random fiber media, are employed in the layers of materials. The hub, once completed, is placed into a furnace for diffusion bonding and later cooled to room temperature. The cooled laminate coil may be cut into various lengths.

21 Claims, 5 Drawing Sheets

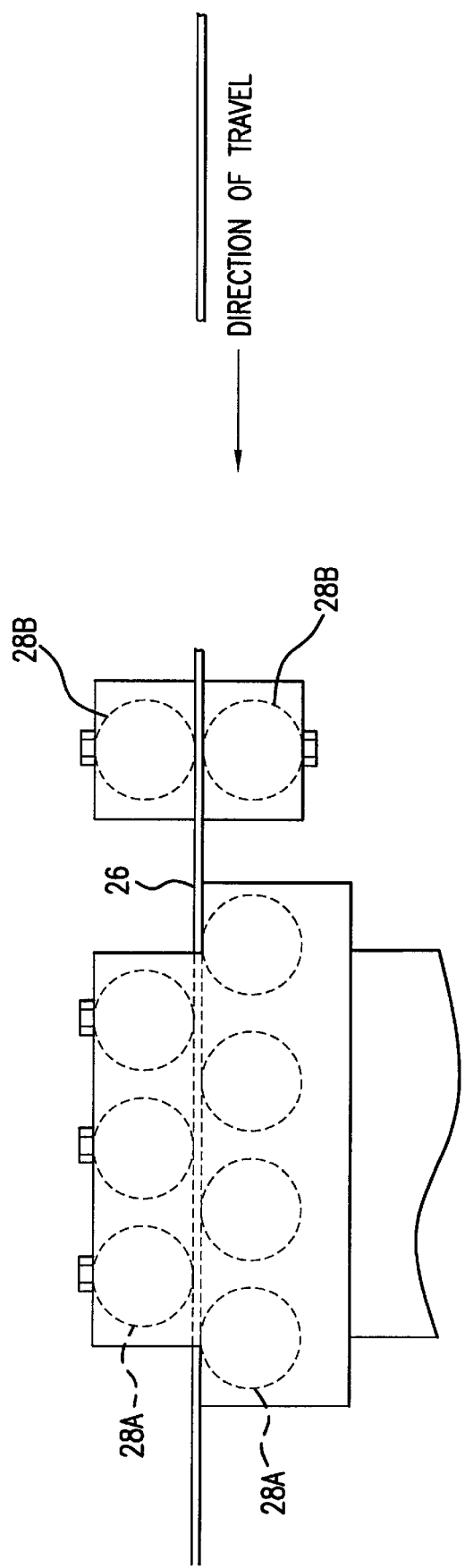

METHOD OF MAKING A CONTINUOUS LAMINATE COIL

BACKGROUND OF THE INVENTION

The present invention relates to diffusion bonded metal laminates, and more particularly, to an apparatus and method of making long, continuous, diffusion bonded metal, laminates.

The oil and gas industries employ specialty pipes for oil and gas wells. One type of specialty pipe used down-hole, is called a "sand control screen". These screens prevent sand and debris from passing from the outside of the pipe to the inside of the pipe while allowing the petroleum products (oil and/or gas) to pass from the outside of the pipe to the inside of the pipe. These down-hole sand control screens typically consist of a perforated metal core, sometimes called a center-pipe, surrounded on its circumference by a permeable, porous metal layer sometimes called a porous metal media, which is further surrounded on its circumference by a perforated metal pipe sometimes called a shroud or a sheath.

These pipes, therefore, are a composite of metal materials whose center layer is porous, permeable, and is itself, a composite of porous, permeable materials.

The porous metal media that is situated between the inner core and the outer shroud is typically made of one or more of the following constructions:

multiple layers of stainless steel mesh either diffusion bonded to each other or not diffusion bonded to each other, or a multitude of layers of stainless steel random fiber media combined with layers of stainless steel mesh either diffusion bonded to each other or not diffusion bonded to each other, or layers of stainless steel powder combined with layers of stainless steel mesh and/or stainless steel random fiber media either diffusion bonded (or sinter bonded) to each other or not diffusion bonded (or not sinter bonded) to each other. Other constructions exist that are not described here.

The porous metal media situated between the core and the outer shroud serves to exclude the flow of sand and debris while allowing the flow of petroleum products, and therefore, acts as a filter. One frequent construction of the porous metal media is a combination of stainless steel woven wire mesh and random fiber media, diffusion bonded to each other to form a single composite. The construction of this porous, permeable composite requires the joining of layers of materials that may be dissimilar in many ways including their basic structure (woven wire mesh vs. random fiber cloth), their alloy, and their surface texture.

Today, the porous, permeable composite situated between the inner core and the outer shroud is produced from small laminate panels, whose greatest length is typically less than 5 feet long. With the current best practice, continuous laminate panels whose length is greater than about 5 feet cannot be made. This limitation is created by the physical size of the furnaces available in today's market. As of today, the largest dimension of any continuous, diffusion bonded laminate panel made with a batch furnace, is limited to the largest internal length of that furnace. Sand control screens are typically much greater in length than these porous metal media laminate panels, and in many cases may be greater than six (6) times the maximum length of the porous metal media laminate panel. Thus, between 4 and 5 panels of porous metal media laminate need to be fastened/connected together (typically by welding) end on end to form a larger, longer porous metal media laminate panel whose length will then be sufficient to cover the entire length of the sand control screen. The longer porous metal media laminate panel resulting from this joining process is called a contiguous laminate panel, and it is discontinuous. The requirement to weld individual panels together to arrive at a long, contiguous laminate panel, poses a significant problem to the producers of sand control screens. Those difficulties include the following:

errors in the application of welding/joining the small laminate panels together can create unacceptably large holes in the porous, permeable composite which in turn, will allow the passing through of sand and debris which could damage above-ground equipment;

the application of welding changes the permeability of the porous metallic media at the weld and thus prevents, impedes or disturbs the normal flow of petroleum products at that location;

the application of welding adds cost to the sand control screen;

the application of welding causes the porous, permeable media to have different elongation, strength and thickness properties at the weld joint, and thus causes problems in the construction of the sand control screen.

Accordingly, there is a need in the art to provide a long, continuous diffusion bonded laminate with consistent mechanical and physical properties, and where existing heating furnaces can be employed.

SUMMARY OF THE INVENTION

The present invention relates to a method of producing, and an apparatus for producing, a long, continuous metal laminate that can be used in the production of a wide variety of products, such as, but not limited to, sand-control screens of long lengths. The invention allows this long laminate to be porous or non-porous, and permeable or non-permeable, depending on whether or not porosity is a requirement of the composite for the particular application.

This same method of producing, and the apparatus for producing a long, continuous, metal laminate has many other applications besides the metal laminate used to produce sand control screens. Long continuous, metal laminates produced per this invention can be used in applications such as:

the construction of polymer fiber air quench systems that require large, continuous, porous laminates as part of their construction;

the construction of long molten polymer filter elements;

the construction of long/large air diffusion panels requiring continuous mechanical properties across their length so as not to create a disturbed air flow.

The method for producing a continuous laminate begins with a rewinder drum, (sometimes called a hub or a reel), adapted for receiving a plurality of layers of strip materials that are wound around the circumference of the rewinder drum. Strips of refractory material, along with perforated metal, metal mesh, random fiber media, and/or foils are simultaneously wound around the circumference of the rewinder drum. The layers of wound material on the rewinder drum form a laminate reel that is then placed into a suitable furnace for diffusion bonding. Once cooled, the long, continuous laminate is unwound from the metal hub, the refractory material removed, and the continuous laminate can then be used in the construction of a sand control screen of desired lengths, and/or other applications where long, continuous metal laminates are preferable to non-continuous metal laminates. By forming the continuous laminate coil in this manner, it is possible to employ conventional heat treatment furnaces. Thus, the method of the invention enables one to form very long lengths of metal laminate, the length of which is greater than the length of the furnace, which would not be possible using conventional batch furnace technology. These very long lengths of metal laminate can then be used to construct very long sand control screens, and/or other products requiring long, continuous, metal laminates.

In one embodiment of the invention, the apparatus employing the method for making the continuous laminate coil employs a stainless steel hub coated with a suitable ceramic material, such as zirconia fiber material. A plurality of metal mesh strips e.g. four, a perforated metal strip, and a refractory material strip are simultaneously wound around the circumference of this stainless steel hub. The layer of refractory is placed on one side of the perforated metal strip which is in contact with the hub surface. The ensemble is then heated in a high temperature furnace. The outcome of this.process is that the four layers of mesh are bonded to each other and to the perforated metal strip to form a long metal, porous, and permeable laminate, which can be subsequently used to form a sand control screen by spiral winding the laminate.

In another embodiment of the invention, the apparatus employing the method for making the continuous laminate coil employs a stainless steel hub coated with a suitable ceramic material, such as zirconia fiber material. Three metal mesh strips, a metal foil strip, and two layers of refractory material strip are simultaneously wound around the circumference of the stainless steel hub. One layer of refractory is placed on each side of the metal foil strip. The ensemble is then heated in a high temperature furnace. The outcome of this process is that the three layers of mesh are bonded to each other and not to the metal foil strip, and, form a long mesh laminate.

Numerous other combinations of two or more strips of refractory material, perforated metal, random fiber metal media and metal mesh, which are simultaneously wound around the circumference of the rewinder drum, are feasible. The combination depends on the requirements of the laminate for the particular application.

BRIEF DESCRIPTION OF THE DRAWINGS

The various advantages of the present invention will become apparent to one skilled in the art from the following specification and sub-joined claims, and referencing the following drawings in which;

FIG. 3B is a side view of the roll straightener used in accordance with an embodiment of the present invention.

DETAILED DESCRIPTION OF THE INVENTION

The following describes one specific application of the invention; that is, a laminate construction comprising a perforated plate, and two layers of mesh material.

Figure 1:
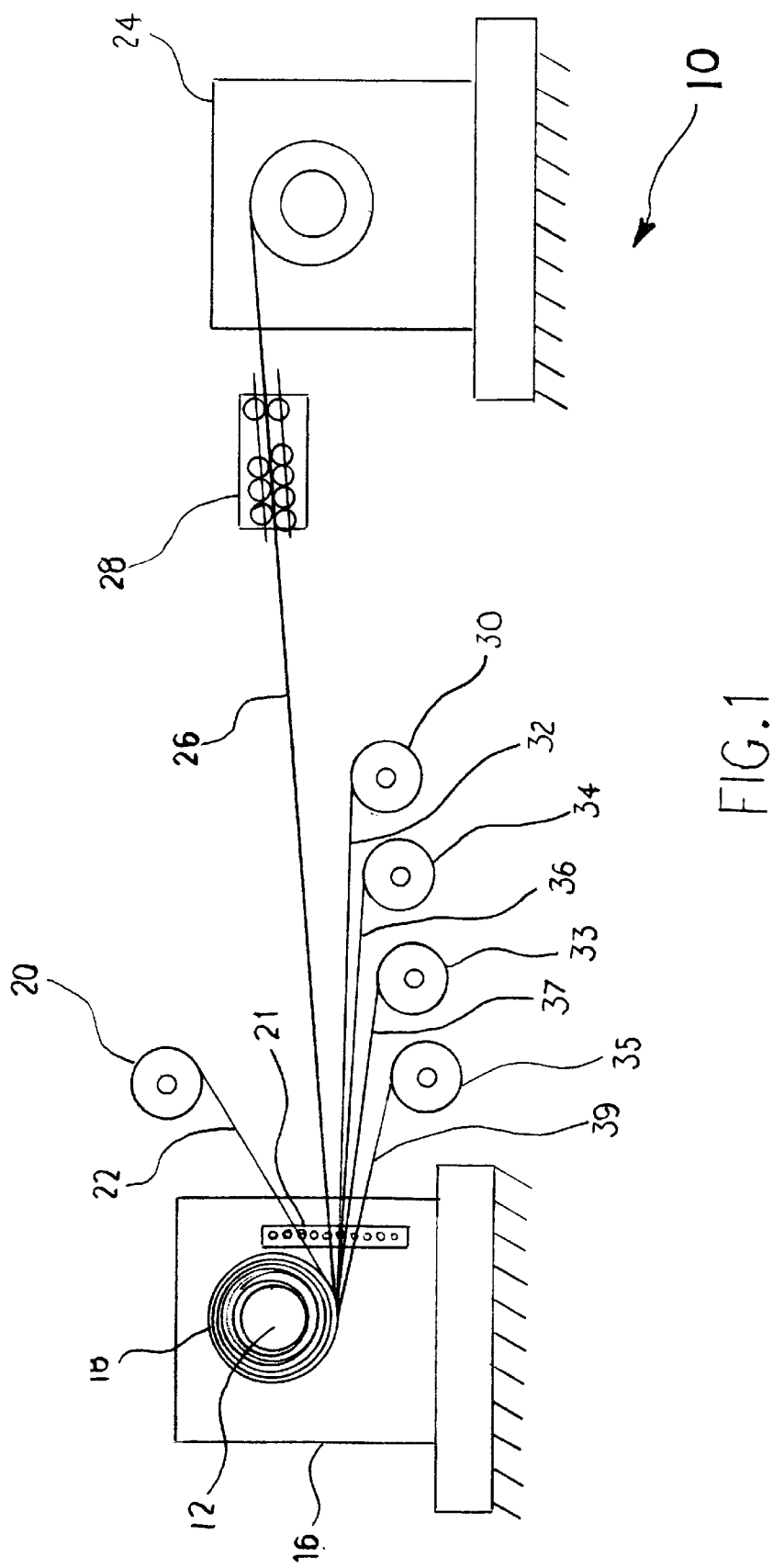
FIG. 1 is an illustrative profile view of an apparatus incorporating the disclosed invention.
Figure 2:
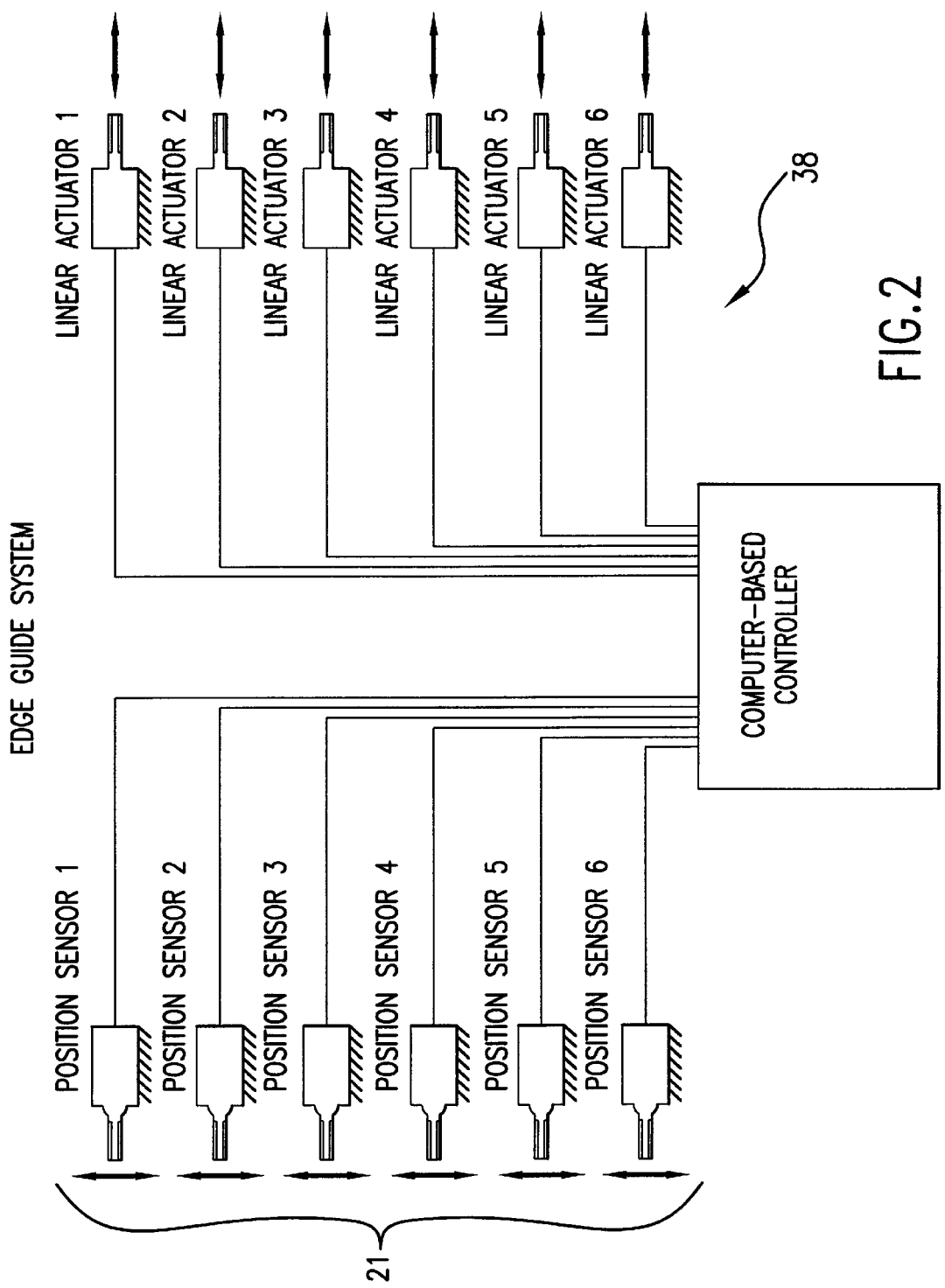
FIG. 2 is a schematic of the edge guide system used in accordance with the present invention.

In FIG. 1, a continuous laminate coil apparatus 10 is shown with a hub, preferably a stainless steel hub, 12 coated with a ceramic substance, such as a zirconia fiber material. The stainless steel hub 12 is mounted to a rewinder 16.

When ladened with strips of material, the stainless steel hub 12 forms a take-up reel 18 which is adapted for receiving a plurality of layers of strip materials which will be wound around the circumference of the stainless steel hub 12. A refractory material core 20 contains a refractory material 22 which acts as an insulator when it is wound around the circumference of the stainless steel hub 12. A tension controlled uncoiler 24 contains a perforated metal strip 26 which lays on top of the refractory material strip 22 and is also wound around the circumference of the stainless steel hub 12. A roll straightener. 28 is used to ensure that the perforated metal strip 26 is free of kinks, bends, and is completely flat before it is wound onto the stainless steel hub 12.

A first mesh core 30 contains a first metal mesh strip 32 which is wound around the circumference of the stainless steel metal hub 12 on top of the perforated metal strip 26. A second mesh core 34 contains a second metal mesh strip 36 which is wound around the circumference of the stainless steel hub 12 on top of the first metal mesh strip 32. A third and fourth mesh cores 33, 35 with respective third and fourth metal mesh strips 37, 39 are wound around the circumference of the stainless steel hub 12. All material strips, the refractory material strip 22 the perforated metal strip 26, and the first through fourth metal mesh strips 32, 36, 37 and 39 are all simultaneously wound around the stainless steel hub 12 one on top of the other in a stack fashion. It is important to maintain the tension of these strips as they are wound around the stainless steel hub 12 to ensure that a contact pressure between the layers is maintained as it is needed for the future bonding of the layers during the diffusion bonding process.

The metal mesh strips 32, 36, 37 and 39 typically can be different in mesh size or there may be combinations of the same and different mesh strips. While the drawing illustrates four mesh cores, it is within the scope of the invention to have two or more mesh cores which may be mounted as shown above the plane of the perforated metal strip 26 or they may be placed below the plane of the perforated metal strip 26 which ever is convenient.

An edge guide system 38 is part of the continuous laminate coil apparatus 10 and is used to control the alignment of each of the strips (the perforated metal strip 26, the first, second, third and fourth metal mesh strips 32, 36, 37, and 39 and the refractory material strip 22) with respect to each other and with respect to the center of the stainless steel hub 12. The edge guide system includes:

- a linear actuator (not shown) with one end mounted to the rewinder 16 and another end mounted to a fixed position such as the floor;
- linear actuators (not shown) mounted in the same fashion as the actuator associated with the rewinder 16 are mounted to airshaft pay-offs (not shown) which carry the first through fourth mesh cores (30, 34, 33, 35);
- a linear actuator (not shown) mounted to the airshaft pay-off (not shown) which carries the refractory material core 20;
- a sensor bank 21 containing a series of position sensors, each sensor dedicated to measuring the edge position of one of the materials (perforated metal strip, first metal mesh strip, second metal mesh strip, third metal mesh strip, fourth metal mesh strip and refractory strip); and a computer-based controller (not shown) that receives input from each of the position sensors, which causes the actuators to move and adjust the position of the rewinder 16, the airshaft payoffs (not shown) which carry the first through fourth mesh cores (30, 34, 33, 35), and the airshaft pay-offs (not shown) which carries the refractory material core 20, so that all the materials are aligned with respect to the centerline of the rewind drum 12.

The sensor bank 21 is strategically located and continuously monitors the position of the perforated metal strip 26 and the first, second, third and fourth metal mesh strips 32, 36, 37, 39 and the refractory material strip 22. These position signals are fed to a computer-based controller (not shown). If an adjustment in alignment is needed, the computer-based controller (not shown) will cause the various actuators to physically re-position either the rewinder 16 and/or the various individual mesh cores (30, 34, 33, 35) and/or the refractory material core 20 as required, thus realigning the layers of material as they are wound and stacked onto the stainless steel hub 12 in forming the take-up reel 18.

Though the edge guide system described above embraces an electro-mechanical design, it is conceivable that any arrangement that will render the same function, aligning the material layers and adjust when necessary, will suffice.

Figure 3A:
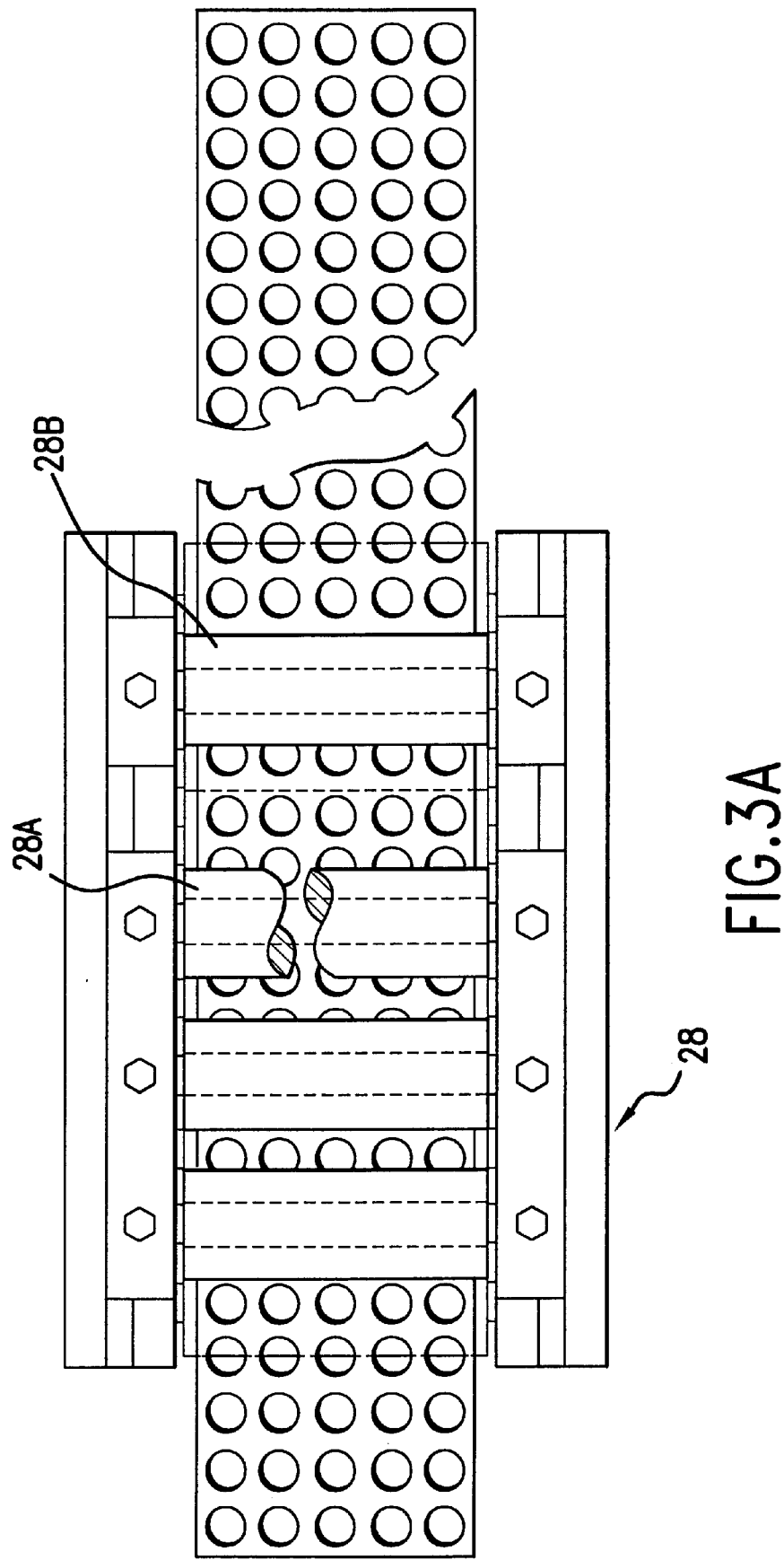
FIG. 3A is a top view of the roll straightener used in accordance with an embodiment of the present invention.
Figure 4:
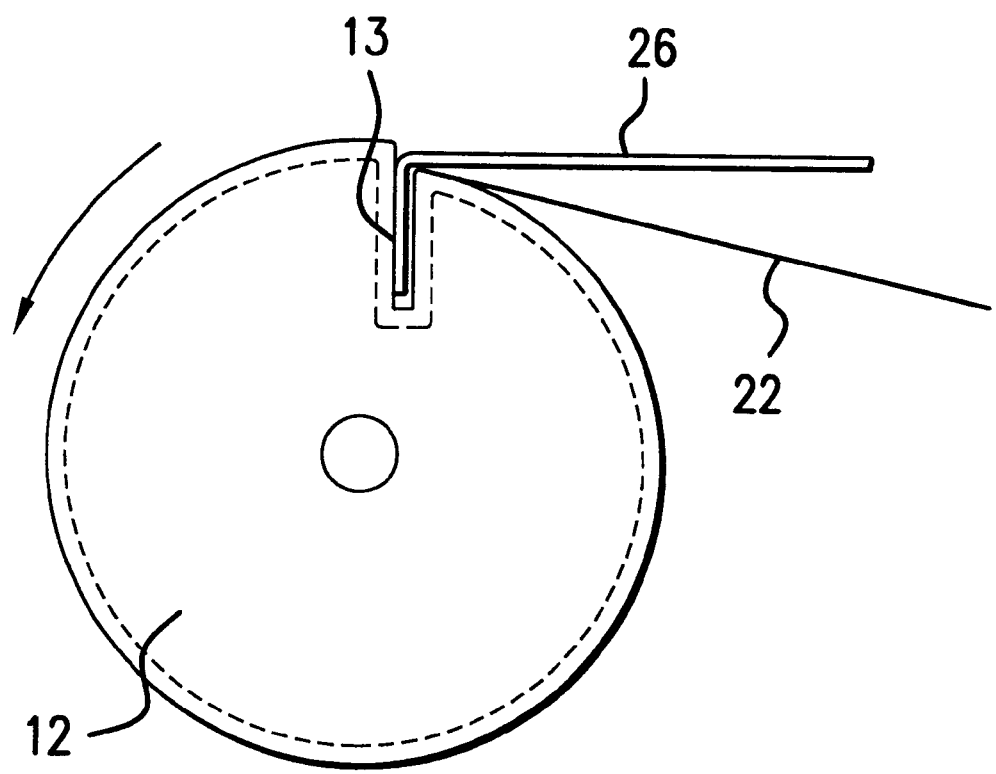
FIG. 4 is a side view of a ceramic coated metal hub used in accordance with an embodiment of the present invention.

In FIG. 3A, the roll straightener 28 includes seven piggyback style rollers 28A and two entry rollers 28B through which the perforated metal strip 26 travels between and is flattened to preserve a non-bending structural integrity en route to the stainless steel hub 12. The perforated metal strip 26 is in reality pressed in the roll straightener 28 as it traverses through the piggy-back style rollers 28A (see FIG. 3B).

Tension must be maintained with all material strips as they are wound around the stainless steel hub 12 to ensure proper bonding when placed into a furnace (not shown) for diffusion bonding. Tension is maintained on the refractory material strip 22 and the perforated metal strip 26 by placing a beginning end of both strips into a slot 13 located in the outer circumference of the stainless steel hub 12. This slot 13 provides an anchor for the perforated strip 26 and the refractory strip 22 as they are wound around the stainless steel hub 12 with the first through fourth material mesh strips 32, 36, 37, 39 stacked on top, respectively.

When the take-up reel 18 has reached a predetermined diameter of layers of materials, the refractory material 22 and the mesh strips 32, 36, 37, and 39 are cut from their respective cores and the perforated metal strip 26 continues to be wound as before but without the mesh and refractory layers being added to the take-up reel. The perforated metal strip 26 continues to be wound onto the take-up reel 18 for several layers and is secured to the next respective lower layer to maintain tension and contact pressure between the layers. The tail of the perforated metal strip 26 which extends beyond where it has been secured to the next respective lower layer on the take-up reel 18 is cut off grinded away, and the take-up reel 18 is then placed in a furnace for diffusion bonding.

The art of diffusion bonding is well established in industry and is routinely applied to construct small metal composites/laminates of various alloys. This invention uses conventional diffusion bonding processes to form the bond between the layers wrapped around the coil. In general terms, diffusion bonding is a method for joining metals and occurs when mating metal surfaces are brought together under certain temperature, time, pressure and atmospheric conditions such as to allow atomic interchange across the interface.

The requirements of the end-user determine the make up of the laminate coil. The perforated metal strip 26 may be replaced by a heavy mesh material, just as there may be just one metal strip and/or additional metal mesh strips in composition of the laminate coil. In some cases, layers of metal mesh will be combined with layers of random fiber media and/or solid foil. If the perforated plate is not necessary for the function of the final product, a non-perforated plate can be used on the tension member. However, the refractory material 22, when used, is the base material and insulates the respective layers formed in the diffusion bonding process.

Those skilled in the art can now appreciate from the foregoing description that the broad teachings of the present invention can be implemented in a variety of forms. Therefore, while this invention both describes a method and an apparatus incorporating the method in connection with a particular example thereof, the true scope of the invention should not be so limited since other modifications will become apparent to the person skilled in the art upon a study of the drawings, specification, and are intended to be encompassed by the following claims.

What is claimed is:

1. A method for making a continuous laminate coil, said method comprising:
   providing a rewinder drum to receive a plurality of layers of materials wound around its circumference;
   winding, simultaneously into layers around the circumference of said rewinder drum, a refractory material strip, a metal strip, and at least one metal mesh strip;
   maintaining tension on said refractory material, said metal strip, and at least one metal mesh strip thereby building a contact pressure between the layers while forming a take-up reel around said rewinder drum;
   securing loose end of said wound metal strip to said take-up reel to maintain tension and contact pressure between the layers;
   diffusion bonding said take-up reel in a furnace to form a laminate coil; and
   cooling said laminate coil to room temperature.

2. The method according to claim 1 further comprising removing excess metal mesh strip from said laminate coil.

3. The method according to claim 2, wherein removing excess metal mesh strip further comprises grinding away said excess metal mesh strip that extends beyond said metal strip to a flush finish.

4. The method according to claim 1, further comprising providing said rewinder drum as a stainless steel hub.

5. The method according to claim 1, further comprising providing said rewinder drum as non-coated metal with a radially inward directed slot for insertion of a beginning end of said refractory material strip, and a beginning end of said metal strip in preparation for winding around said rewinder hub.

6. The method according to claim 1, further comprising aligning said plurality of layers of materials before and while they are wound around the circumference of said rewinder drum by employing an edge guide system.

7. The method according to claim 6, further comprising employing said edge guide system wherein a plurality of sensors detect misalignment and alert actuators to re-position the plurality of layers of materials.

8. The method according to claim 1, further comprising providing said rewinder drum as stainless steel coated with a ceramic material.

9. The method according to claim 1 further comprising providing said rewinder drum as stainless steel coated with a zirconia fiber material.

10. The method according to claim 1, further comprising securing a beginning end of said refractory material strip, and a beginning end of said metal strip to a radially inward directed slot in said rewinder drum.

11. The method according to claim 1, further comprising simultaneously winding a first metal mesh strip on top of said metal strip, which is wound on top of said refractory metal strip in forming said take-up reel.

12. The method according to claim 1, further comprising simultaneously winding a second metal mesh strip on top of a first metal mesh strip, which is wound on top of said metal strip, which is wound on top of said refractory material strip in forming said take-up reel.

13. The method according to claim 1, further comprising simultaneously winding a plurality of metal mesh strips in a stack on top of each other, said stack is wound on top of said metal strip, which is wound on top of said refractory material strip in forming said take-up reel.

14. The method according to claim 1, further comprising simultaneously winding a second metal mesh strip on top of a first metal mesh strip, which is wound on top of said refractory material in forming said take-up reel.

15. The method according to claim 1, further comprising simultaneously winding, in any stacking order, at least one metal mesh strip, and said metal strip, with said refractory material always constituting a base layer in forming said take-up reel.

16. The method according to claim 1, wherein a continuous, welded spiral wound pipe is formed from said laminate coil.

17. The method according to claim 1, further comprising flattening said metal strip with a roll straightener.

18. A method for making a continuous laminate coil, said method comprising:

providing a rewinder drum to receive a plurality of layers of materials wound around its circumference;

winding, simultaneously into layers around the circumference of said rewinder drum, a refractory material strip, a perforated metal strip, and at least one metal mesh strip;

maintaining tension on said refractory material, said perforated metal, and at least one metal mesh strip thereby building a contact pressure between the layers while forming a take-up reel around said rewinder drum;

securing loose ends of said wound refractory material, said perforated metal and at least one metal mesh strip to said take-up reel to maintain tension and contact pressure between the layers;

diffusion bonding said take-up reel in a furnace to form a laminate coil; and cooling said laminate-coil to room temperature.

19. A method for making a continuous laminate coil, said method comprising:

providing a ceramic coated metal hub to receive a plurality of layers of material wound around its circumference;

winding, simultaneously into layers around the circumference of said hub, a refractory material strip as a base, a perforated metal strip, and a first and a second metal mesh strip stacked on top of each other, respectively;

aligning said plurality of layers of materials with an edge guide system;

securing loose ends of said wound refractory material, said perforated metal and said first and second metal mesh strips to said wound coil to maintain tension and contact pressure between the layers;

diffusion bonding said take-up reel in a furnace thus forming a laminate coil; and cooling said laminate coil to room temperature.

20. The method according to claim 19 further comprising removing excess metal mesh strip from said laminate coil.

21. The method according to claim 19 wherein winding includes replacing said perforated metal strip with a third metal mesh strip.

* * * * *